United States Patent
Motojima

(10) Patent No.: US 6,572,392 B2
(45) Date of Patent: Jun. 3, 2003

(54) PUSH-PUSH TYPE CARD CONNECTOR COMPRISING A CAM MECHANISM USING A GENERALLY HEART-SHAPED CAM GROOVE

(75) Inventor: Joe Motojima, Akishima (JP)

(73) Assignee: Japan Aviation Electronics Industry, Limited, Shibuya-Ku (JP)

(*) Notice: Subject to any disclaimer, the term of this patent is extended or adjusted under 35 U.S.C. 154(b) by 0 days.

(21) Appl. No.: 09/884,619

(22) Filed: Jun. 19, 2001

(65) Prior Publication Data

US 2002/0192991 A1 Dec. 19, 2002

(51) Int. Cl.[7] ............................................... H01R 13/62
(52) U.S. Cl. ........................................................ 439/159
(58) Field of Search ................................. 439/157, 159, 439/59, 629

(56) References Cited

FOREIGN PATENT DOCUMENTS

| JP | 10-312854 | 11/1998 | ......... H01R/13/629 |
| JP | 11135192 | 5/1999 | |
| JP | 2000195546 | 7/2000 | |

*Primary Examiner*—Khiem Nguyen
(74) *Attorney, Agent, or Firm*—Michael Best & Friedrich LLC

(57) ABSTRACT

In a push-push type card connector in which a contact held by an insulator, an eject lever is coupled to the insulator to be movable in ejecting and inserting directions of a card and is continuously urged by a spring in the ejecting direction. The insulator has a pair of frame portions which are for guiding the card in the ejecting and the inserting directions. The contact is for coming in contact with the card inserted between the frame portions in the inserting direction. The eject lever has a guide portion slidable along one of the frame portions and an engaging portion for being engaged with the card in the ejecting direction.

3 Claims, 4 Drawing Sheets

PUSH-PUSH TYPE CARD CONNECTOR COMPRISING A CAM MECHANISM USING A GENERALLY HEART-SHAPED CAM GROOVE

BACKGROUND OF THE INVENTION

This invention relates to a push-push type card connector capable of inserting/ejecting a card into/from the connector by repeating a pushing operation of the card.

A card connector of the type is disclosed, for example, in Japanese Unexamined Patent Publication (A) No. H10-312854. Hereinafter, the card connector disclosed in the above-mentioned publication will be summarized. The card connector comprises a body, a frame fixed to the body, a slider for sliding with respect to the frame upon insertion and ejection of the card and for receiving the card to be mounted thereon, a cam mechanism formed on the slider, and a detection switch formed on the body to detect a state where the card is fitted into the connector. The cam mechanism serves to lock the state where the card is fitted into the connector. The detection switch is provided with a pin member movably attached thereto so as to open and close the detection switch and to lock the cam mechanism. When the slider is inserted into the connector and the card is fitted into the connector, the pin member is engaged with a branching portion of the cam mechanism to lock the slider and brings a movable armature of the detection switch into contact with a fixed armature.

In the above-mentioned conventional card connector, the pin member for locking the slider and its attachment structure are complicated. In addition, a large number of components are necessary. As a result, it is difficult to miniaturize the connector.

SUMMARY OF THE INVENTION

It is therefore an object of this invention to provide a push-push type card connector which is simple in structure and small in number of components.

Other objects of the present invention will become clear as the description proceeds.

According to the present invention, there is provided a push-push type card connector which comprises an insulator having a pair of frame portions which are for guiding a card in an ejecting direction thereof and an inserting direction opposite to the ejecting direction, a contact held by the insulator for coming in contact with the card inserted between the frame portions in the inserting direction, an eject lever coupled to the insulator and movable in the ejecting and the inserting directions, and a spring continuously urging the eject lever in the ejecting direction. The eject lever comprises a guide portion slidable along the one of the frame portions and an engaging portion connected to the guide portion for being engaged with the card in the ejecting direction.

DESCRIPTION OF PREFERRED EMBODIMENT

Figure 1:
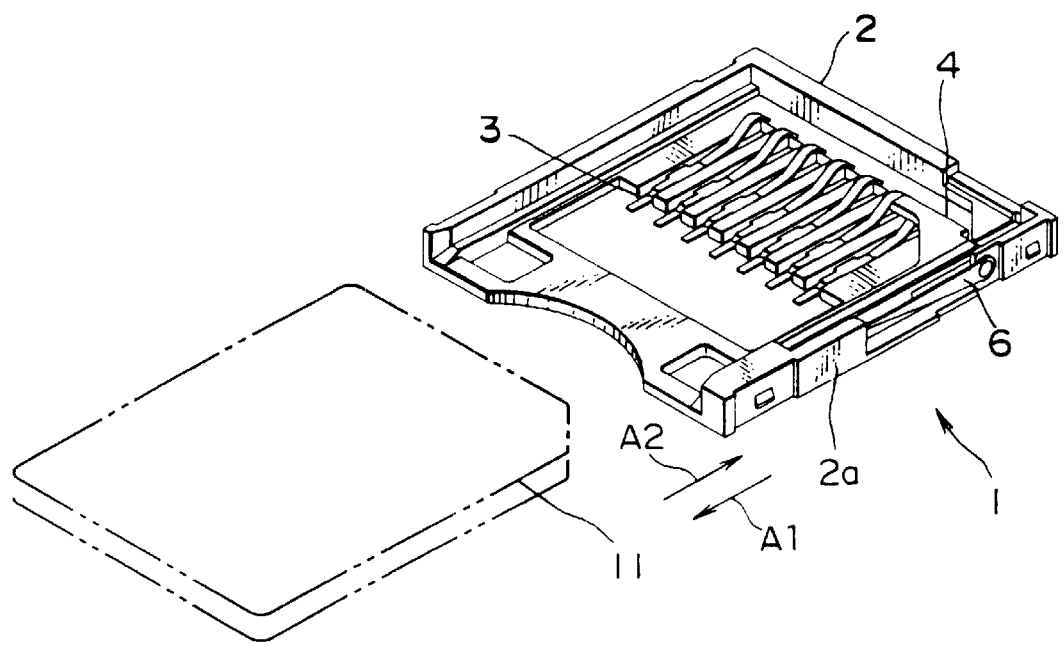
FIG. 1 is a perspective view of a push-push type card connector according to an embodiment of this invention.
Figure 2:
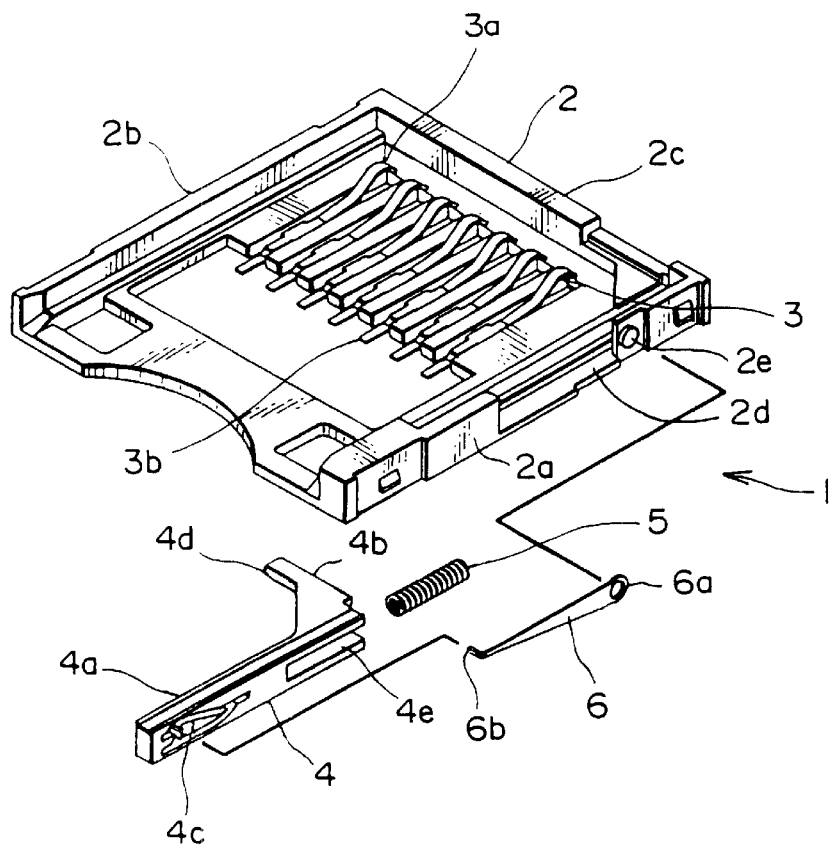
FIG. 2 is an exploded perspective view of the connector in FIG. 1.

Referring to FIGS. 1 and 2, description will be made as regards an overall structure of a push-push type card connector according to an embodiment of this invention.

The connector is depicted by a reference numeral 1 and includes an insulator 2, a plurality of contacts 3 fixed to the insulator 2, an eject lever 4 attached to a frame portion 2a of the insulator 2, a compression coil spring 5 continuously urging the eject lever 4 in an ejecting direction A1, and a cam follower 6 adapted to be guided along a cam groove 4c made or formed in the eject lever 4. The cam groove 4c is generally heart-shaped and will be referred to as a heart cum.

A card 11 is inserted into the connector 1 in an inserting direction A2 opposite to the ejecting direction A1 and is ejected from the connector 11 in the ejecting direction A1. The connector 1 is entirely covered with a rectangular cover (not shown).

The insulator 2 has a generally rectangular shape and is made from a synthetic resin material. The insulator 2 is provided with U-shaped frame portions 2a, 2b, and 2c formed on three sides thereof, respectively. Each of contacts 3 has a convex-curved contact point 3a at one end and a flat contact point 3b at the other end. The convex-curved contact point 3a protrudes into an area to which the card 11 is inserted.

The eject lever 4 has a generally L shape and is made from a metal material. The eject lever 4 has a guide portion 4a and a right angle bending portion 4b. The guide portion 4a is provided with a cam groove 4c formed on one surface thereof. The right-angle bending portion 4b has a card contacting portion 4d for receiving a forward end of the card 11 to be brought into contact therewith. The guide portion 4a of the eject lever 4 is slidably received in a groove (not shown) having a U-shaped section and formed in the frame portion 2a. The compression coil spring 5 is inserted into a groove 4e formed on one surface of the guide portion 4a. The compression coil spring 5 has one end brought into contact with the eject lever 4 and the other end brought into contact with an inner surface of the frame portion 2c. Accordingly, the eject lever 4 is continuously urged by the compression coil spring 5 in the ejecting direction in which the card 11 is ejected from the connector 1.

The cam follower 6 is formed into a lever-like shape and disposed in a notch 2d formed on the outside of the frame portion 2a to be rotatable over a predetermined angle. The cam follower 6 has a hole 6a formed at its base portion and fitted over a shaft 2e formed on the frame portion 2a. In other words, the cam follower 6 is pivoted at its base portion by the frame portion 2a. The cam follower 6 has a guide pin 6b which is formed by bending at its tip portion and penetrates a hole (not shown) formed on the frame portion 2a to be engaged with the cam groove 4c. A combination of the heart cum or the cam groove 4c and the cam follower 6 will be referred to as a position control arrangement for controlling a position of the eject lever 4 in the ejecting and the inserting directions.

Figure 3:
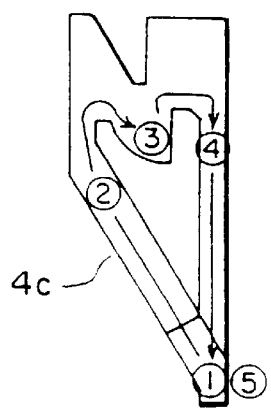
FIG. 3 is a schematic view showing a shape of a cam groove of a cam mechanism in the connector in FIGS. 1 and 2.

Referring to FIG. 3 in addition, description will be made of the cam groove 4c in detail. The cam groove 4c has a start point ① where the guide pin 6b of the cam follower 6 starts to move, a guide portion ② inclined with respect to a sliding direction of the eject lever 4, a depressed portion ③ following the guide portion, a guide portion ④ parallel to the sliding direction of the eject lever 4, namely, the ejecting direction A1 and the inserting direction A2 of the card 11, and a terminal point ⑤ where the guide pin 6b finally arrives, which is identical with the start point ①. In a free state, the guide pin 6b is preliminarily urged by elasticity of the cam follower 6 leftward in FIG. 3, namely, towards the guide portion ② inclined as mentioned above.

Further referring to FIGS. 4A through 4E and 5A through 5E, description will be made of insertion and ejection of the card 11 into and from the connector 1. FIGS. 4A through 4E and FIG. 5A through 5E are in one-to-one correspondence to each other.

Figure 4A:
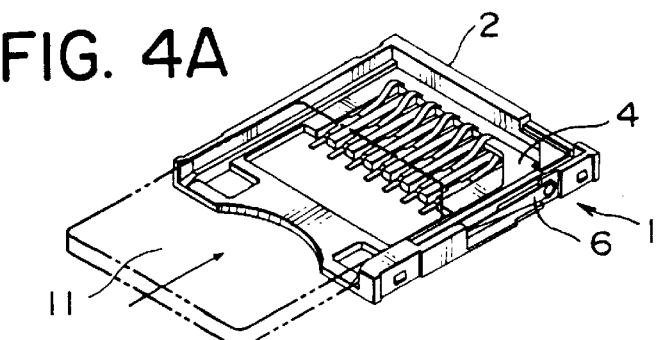
FIGS. 4A through 4E are perspective views showing a series of steps upon insertion and ejection of a card into and from the connector in FIG. 1.
Figure 5A:
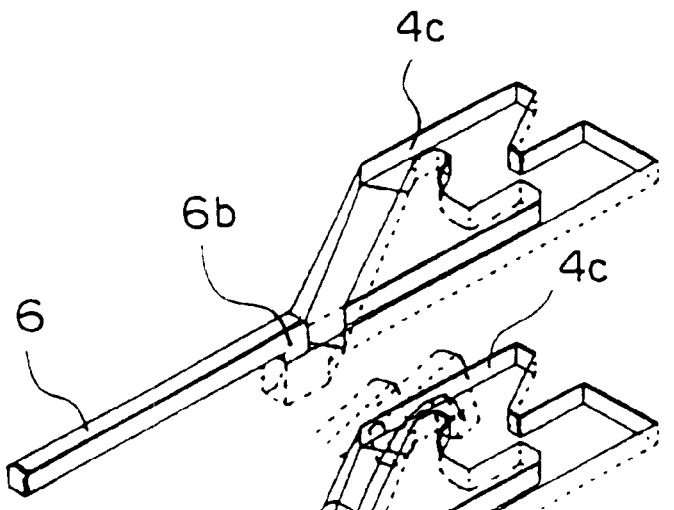
FIGS. 5A through 5E are views for describing a movement of the cam mechanism in FIGS. 1 and 2.

FIG. 4A shows the free state where the card 11 is partially inserted into the connector 1. In the free state, the guide pin 6b of the cam follower 6 is positioned at the start point (① in FIG. 3) of the cam groove 4c, as shown in FIG. 5A.

Figure 4B:
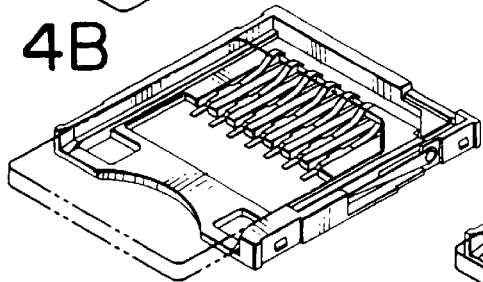
Figure 4D:
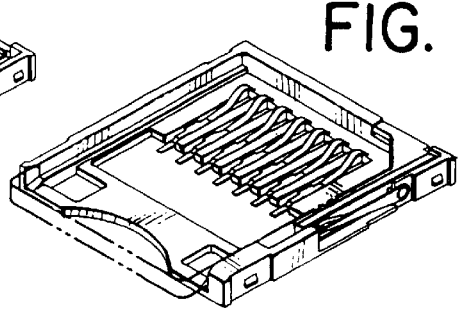
Figure 4C:
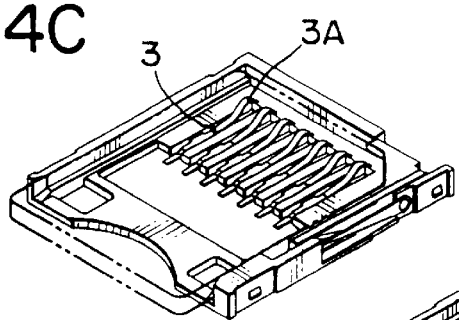
Figure 4E:
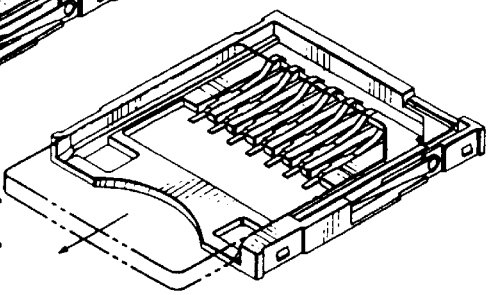
Figure 5B:

When the card 11 is pushed inward into the connector 1, the forward end of the card 11 is brought into contact with the card contacting portion 4d of the eject lever 4. Thereafter, the card 11 and the eject lever 4 are integrally slide towards the interior of the connector 1 against compression force of the compression coil spring 5. This sliding state is shown in FIG. 4B. In the sliding state shown in FIG. 4B, the guide pin 6b is positioned at the inclined guide portion (② in FIG. 3) of the cam groove 4c, as shown in FIG. 5B.

Figure 5C:

Subsequently, the card 11 is pushed over a maximum stroke and, thereafter, the pushing operation is stopped. In this event, the card 11 and the eject lever 4 are slightly returned by restoring force of the compression coil spring 5 to be put in a fitting state shown in FIG. 4C. In the fitting state of FIG. 4C, a plurality of pads (not shown) of the card 11 are kept in contact with the convex-curved contact points of the contacts 3, respectively. At the same time, the guide pin 6 is positioned at the depressed portion (③ in FIG. 3) of the cam groove 4c, as shown in FIG. 5C. Thus, the fitting operation of the card 11 is finished.

Figure 5D:
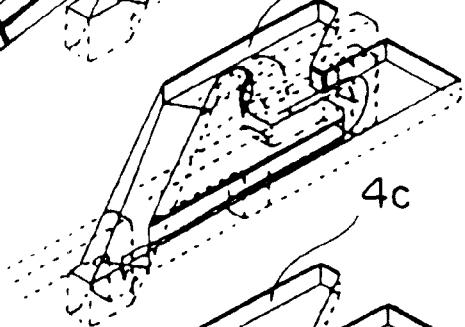
Figure 5E:
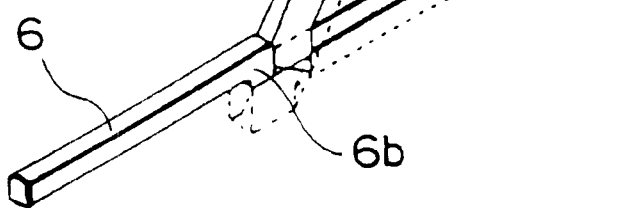

Once again, the card 11 is pushed over the maximum stroke and, thereafter, the pushing operation is stopped. In this event, as shown in FIG. 5D, the guide pin 6b escapes from the depressed portion (③ in FIG. 3) of the cam groove 4c. Thereafter, the guide pin 6b travels through the guide portion (④ in FIG. 3) to reach the terminal point ⑤, namely, the start point ① as shown in FIG. 5E. The card 11 and the eject lever 4 pass through the state of FIG. 4D and reach the state of FIG. 4E under the restoring force of the compression coil spring 5. Thus, the ejecting operation of the card 11 is finished.

In the foregoing, the cam groove 4c is formed on the eject lever 4 and the cam follower 6 is formed on the insulator 2. Alternatively, the cam groove may be formed on the insulator and the cam follower may be formed on the eject lever.

What is claimed is:

1. A push-push type card connector comprising:

an insulator having a pair of frame portions which are for guiding a card in an ejecting direction thereof and an inserting direction opposite to said ejecting direction;

a contact held by said insulator for coming in contact with said card inserted between said frame portions in said inserting direction;

an eject lever coupled to said insulator and movable in said ejecting and said inserting directions;

a spring continuously urging said eject lever in said ejecting direction;

position control means coupled to said insulator and said eject lever for controlling a position of said eject lever in said ejecting and said inserting directions;

said eject lever comprising:
        a guide portion slidable along the one of said frame portions: and
        an engaging portion connected to said guide portion for being engaged with said card in said ejecting direction;
    said position control means comprising:
        a heart cam coupled to said eject ever; and
        a cam follower connected to said insulator and engaged with said heart cam.

2. The push-push type card connector according to claim 1, wherein:

said heart cam has a cam groove made to said guide portion of the eject lever to have a heart shape, and said cam follower has a guide pin inserted into said cam groove.

3. The push-push type card connector according to claim 2, wherein:

said cam follower is pivoted at an end thereof by the one of said frame portions, and said guide pin is at another end of said cam follower.

* * * * *